United States Patent
Turner et al.

(10) Patent No.: US 11,585,613 B2
(45) Date of Patent: Feb. 21, 2023

(54) SYSTEM AND METHOD FOR INSTALLING EXTERNAL CORROSION GUARDS

(71) Applicant: Corrosion Monitoring Service, Inc., St. Charles, IL (US)

(72) Inventors: Steven A Turner, Wheaton, IL (US); Alexander Turner, Winfield, IL (US); Ronald Charles Preston, Geneva, IL (US)

(73) Assignee: Corrosion Monitoring Service, Inc., St. Charles, IL (US)

( * ) Notice: Subject to any disclaimer, the term of this patent is extended or adjusted under 35 U.S.C. 154(b) by 0 days.

(21) Appl. No.: 16/386,469

(22) Filed: Apr. 17, 2019

(65) Prior Publication Data
US 2019/0257597 A1 Aug. 22, 2019

Related U.S. Application Data

(62) Division of application No. 15/131,253, filed on Apr. 18, 2016, now Pat. No. 10,323,888.

(51) Int. Cl.
*F28F 19/00* (2006.01)
*B23P 15/26* (2006.01)
*F28D 21/00* (2006.01)

(52) U.S. Cl.
CPC ............ *F28F 19/002* (2013.01); *B23P 15/26* (2013.01); *F28D 21/001* (2013.01)

(58) Field of Classification Search
CPC ........ F28F 9/22; F28F 2009/226; F28F 19/00; F28F 19/002; F28F 2265/30; F28F 21/082; F28D 21/0003; F22B 37/104; F22B 37/107
See application file for complete search history.

(56) References Cited

U.S. PATENT DOCUMENTS

| | | | | |
|---|---|---|---|---|
| 2,368,391 A | * | 1/1945 | Young | 165/79 |
| 4,288,109 A | * | 9/1981 | Ellis | F28F 9/185 |
| | | | | 285/141.1 |
| 2010/0000474 A1 | * | 1/2010 | Petanen | F22B 37/107 |
| | | | | 122/367.1 |
| 2010/0116478 A1 | * | 5/2010 | Wanni | F28F 9/0131 |
| | | | | 165/162 |
| 2012/0073483 A1 | * | 3/2012 | Ojanpera | F28F 19/002 |
| | | | | 110/302 |
| 2014/0352931 A1 | * | 12/2014 | Turner | F28F 21/082 |
| | | | | 165/134.1 |
| 2016/0273845 A1 | * | 9/2016 | Rizzi | F28D 7/06 |
| 2017/0205147 A1 | * | 7/2017 | Rizzi | F28F 9/0241 |

FOREIGN PATENT DOCUMENTS

| CN | 2596308 Y | * | 12/2003 | |
|---|---|---|---|---|
| JP | 05141894 A | * | 6/1993 | ............ F28F 19/002 |

* cited by examiner

*Primary Examiner* — Eric S Ruppert
(74) *Attorney, Agent, or Firm* — Rockman Videbeck & O'Connor

(57) ABSTRACT

The system and method for installing external corrosion guards of the present disclosure comprises a method of protecting tubing in tubular heat exchangers from external corrosion that includes the installation of protective collars or guards around the tube outer diameter at the tubsheet plate, anti-vibration baffle, and/or pass partition plate levels. The external corrosion guards can be installed using a ridge method, where a ridge sits on a plate level, using a mechanical expansion method, and using a mechanical rolling method.

4 Claims, 9 Drawing Sheets

SYSTEM AND METHOD FOR INSTALLING EXTERNAL CORROSION GUARDS

This application is a divisional application of, and claims priority to U.S. non-provisional application Ser. No. 15/131,253, filed on Apr. 18, 2016, to the extent allowed by law.

TECHNICAL FIELD

The present disclosure relates to the structure and design of heat transfer tubing used in tubular heat exchangers. More specifically, the invention is concerned with mitigating or reducing the rates of tube failures occurring at the bottom of tubesheet or anti-vibration baffle levels caused by external corrosion.

BACKGROUND

Tubular head exchangers are commonly found in large boiler systems and are typically used to increase operational efficiency or as part of the pollution process. Where the heat exchanger is used to increase operational efficiency, the heat exchanger converts thermal energy present in waste gas generated in combustion for use in another process. For example, in the electric utility industry, the combustion of coal generates a significant volume of hot flue gas. Following combustion, the flue gas exits the boiler outlet duct and travels into a tubular heat exchanger. At the tubular heat exchanger, the heat and energy contained in the flue gas is transferred into a plurality of thinly walled metal tubes. Large fans are used to push ambient air over the thinly walled heated tubes and an exit duct carries the air to the boiler for combustion. This process raises the temperature of combustion air entering the boiler, thereby improving boiler thermal efficiency and reducing net fuel consumption.

Outside of improving operational efficiency, tubular heat exchangers serve an integral role in the pollution control process. The vast majority of pollution control systems are designed around strict velocity, temperature, and volumetric parameters. For example, a fabric filter baghouse is an air pollution control equipment device that is used to collect particulate matter present in flue gas streams to prevent the emission of the fine particulates into the atmosphere. The efficiency and longevity of the fabric filter baghouse depends upon the operator's ability to control the temperature and velocity of the flue gas as it enters the fabric filter baghouses. In the Portland cement industry, a tubular heat exchanger is used for the sole purpose of controlling flue gas temperature and velocity prior to particulate matter collection at the fabric filter baghouse.

With respect to design, tubular heat exchangers are fixed structures consisting of a plurality of thinly walled straight metal tubes. Groups of tubes, often referred to as bundles or banks, extend through the outlet ducting of the boiler and open at the end of the ducting. The tubes are mechanically rolled or expanded into a thick metal tubesheet and intermediate baffles may be used to provide structural support. The entire system is enclosed in a steel casing which serves as the enclosure for the air or gas passing outside of the tubes.

Tubular heat exchangers are most commonly classified as either vertical or horizontal designs. In the vertical design, tube bundles are arranged vertically and flue gas enters through the inner diameter of the heat exchanger tubing. At the top of the system, the tubes are mechanically rolled or expanded into tubesheet plates located at the top and bottom of the structure. The tubesheet is made from steel that ranges in thickness from one inch to three inches. The tubesheet plate provides physical stability for the structure and also creates a seal between the air and the gas flow.

In a horizontal design, the tube bundles are arranged horizontally. Similar to the vertical design, the horizontal tubes are mechanically rolled or expanded into the tube sheet plates. The primary distinction between the horizontal and vertical designs is that hot flue gas travels over the outer diameter of the tubes with combustion air passing through the inner diameter of the tube in the horizontal design.

Common in both the horizontal and the vertical designs is the use of anti-vibration baffles. The anti-vibration baffles provide structural support for the tube length and also help prevent against the occurrence of mechanical damage that may result from the vibration of tubing while the boiler is in operation. The anti-vibration baffles typically comprise steel plates containing 'baffle holes' that allow the tubes to pass through the plate. The anti-vibration baffle levels will be arranged either horizontally or vertically, perpendicular to the tubes, and multiple baffle levels may exist depending on the tube length and design specifications. The baffle location, or level, may exist at various lengths but are most commonly found at approximately four to six feet away from the nearest tubesheet plate or next anti-vibration baffle.

Additionally, pass partition plates are used to redirect air and/or gas flow in order to force the air and/or gas to make multiple passes over the tube bundles. The pass partition plates appear substantially similar to the anti-vibration baffles, with tubes passing through holes contained in the pass partition plates. The primary distinction of the pass partition plate is that the length of the pass partition plate extends further than the anti-vibration baffle to the casing wall that encloses the heat exchanger.

During boiler operation, fly ash generated during combustion commonly accumulates at the anti-vibration baffles, pass partition plates, or at the bottom of the tubesheet plates. The volume and chemical composition of the fly ash varies greatly. Factors that may impact the fly ash composition include fuel source, pollution control method systems, and boiler use. The volume of fly ash at various tubular heat exchanger levels may range from minimal to over several feet in extreme cases.

During outages, it is common practice to clean or remove the fly ash that has accumulated on the equipment used in the boiler system. In tubular heat exchangers, one cleaning method includes using high pressure water to push the fly ash from the tube length, anti-vibration baffle, pass partition plate, or the top and/or bottom tubesheets. The fly ash is then ordinarily collected in an ash hopper located beneath the heat exchanger.

This cleaning method commonly results in the accumulation of both water and fly ash in the tubular heat exchanger. This frequently results in the creation of a highly acidic slurry at the tubesheet plates, anti-vibration baffles, and pass partition plates. The acidic slurry may remain stagnant during the length of the outage and present during portions of operation.

Tube bundles remain in continuous contact with the acidic slurry at the baffle or plate level. At the baffle level, the slurry also drips downward and onto the tube length. This does not occur at the tubesheet plate level where the tubes have been rolled into the plate.

Contact with the acidic slurry causes the tubing to corrode from the outside in. This damage mechanism is referred to as 'external corrosion' and commonly results in tube failures.

A heat exchanger tube is considered to have failed where a hole or leak has developed on the tube surface. The hole allows air or gas to leak into the stream and the failures substantially decrease the efficiency of the heat exchanger and cause a decrease in the boiler's overall efficiency.

Where boiler efficiency has been decreased, negative results include increased fuel consumption, increased rates of internal power consumption, and decreased performance of pollution control systems. A tube that has developed a failure requires replacement or repair.

SUMMARY

The system and method for installing external corrosion guards of the present disclosure comprises a method of protecting tubing in tubular heat exchangers from external corrosion that includes the installation of protective collars or guards around the tube outer circumference at the tubesheet plate, anti-vibration baffle, and/or pass partition plate levels.

The system for protecting a tube from external corrosion includes a tubular heat exchanger that includes a top tubesheet plate and a bottom tubesheet plate, the top tubesheet plate and bottom tubesheet plates including a plurality of apertures. A plurality of tubes are disposed between the plurality of apertures in the top tubesheet plate and the plurality of apertures in the bottom tubesheet plate. At least one of an anti-vibration baffle and a pass partition plate are disposed between the top tubesheet plate and the bottom tubesheet plate, the at least one anti-vibration baffle and pass partition plate including a plurality of apertures adapted to receive said plurality of tubes. At least one steel collar is adapted to sealingly connect to at least one tube in the plurality of tubes, the at least one steel collar adapted to extend a predetermined first distance above and a predetermined second distance below at least one of the tubesheet plate, anti-vibration baffles, and pass partition plate, guarding the tubes from further corrosion.

BRIEF DESCRIPTION OF THE DRAWINGS

The various features, advantages, and other uses of the system and method will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1A:
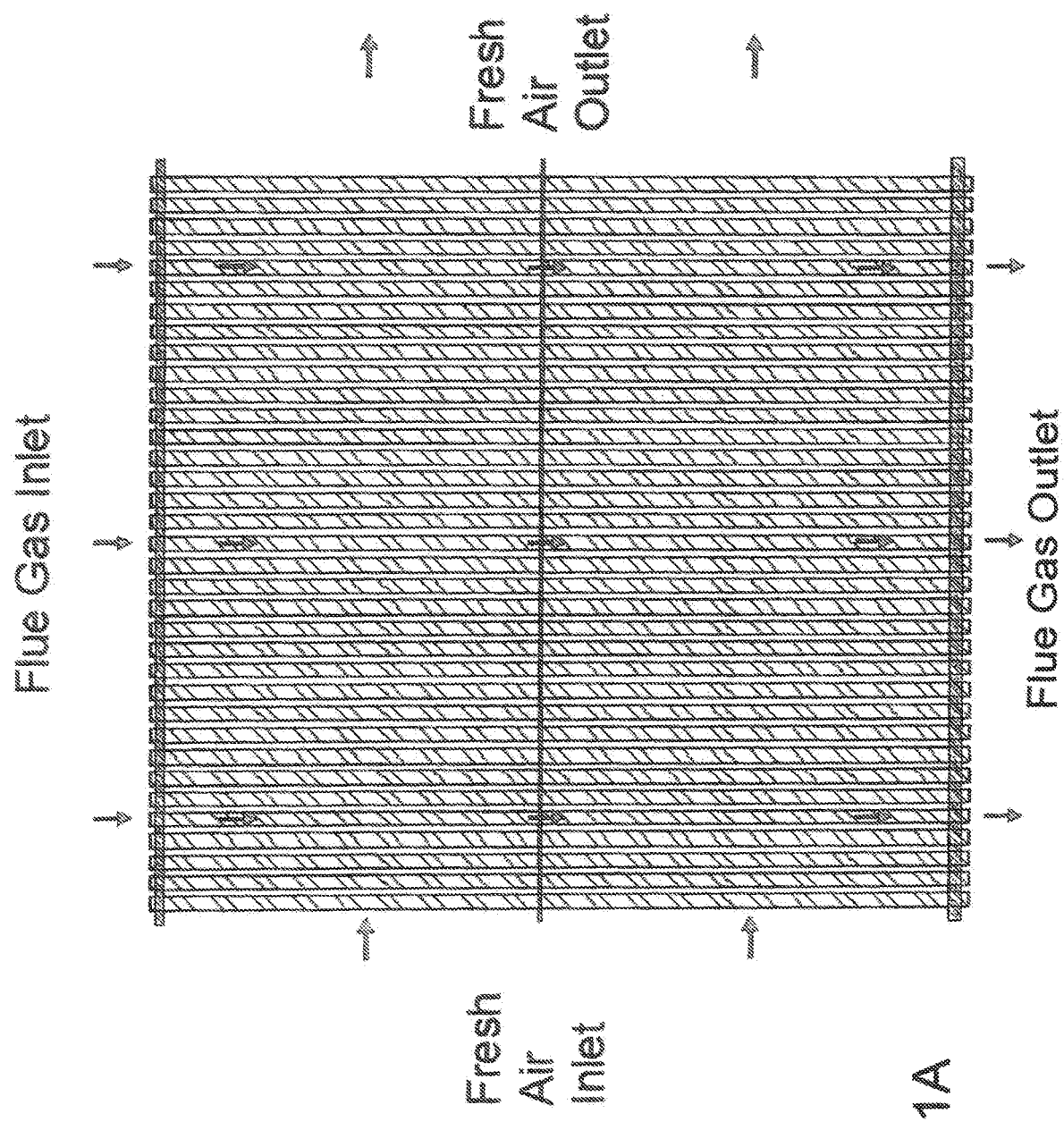
FIG. 1A is a front plan view of a vertical tubular heat exchanger of the system and method for installing external corrosion guards of the present disclosure, showing an anti-vibration baffle.
Figure 2:
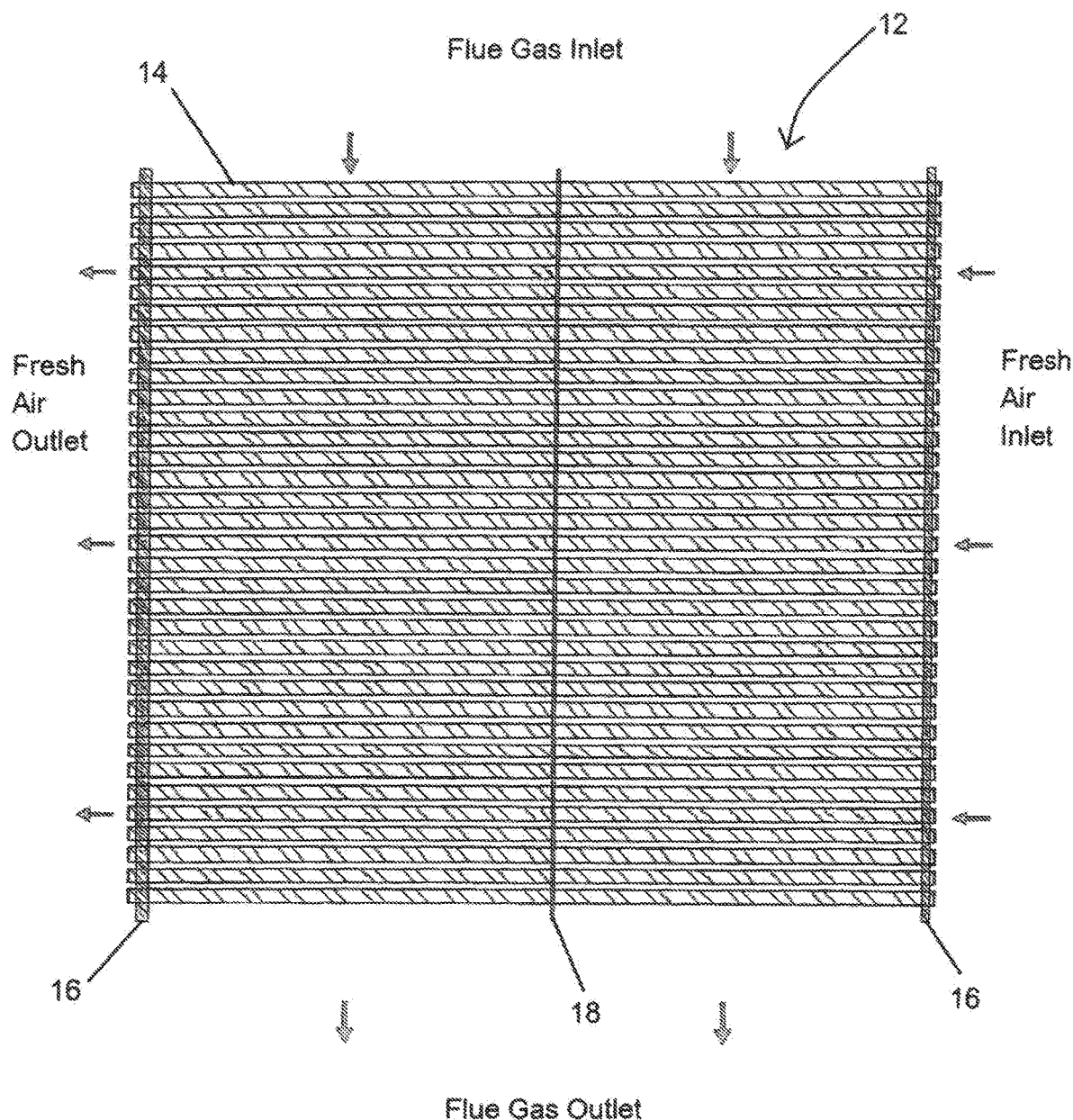
FIG. 2 is a front plan view of a horizontal tubular heat exchanger of the system and method for installing external corrosion guards of the present disclosure.

In tubular heat exchangers, hot flue gas generated during combustion travels to bundles of heat transfer tubing. Depending on the design, the flue gas will either travel through the inner diameter of the heat transferring tube, as in a vertical tubular heat exchanger design, or the flue gas will travel over the outer diameter of the heat transferring tube, as in a horizontal tubular heat exchanger design. Where the flue gas travels through the inner diameter of a plurality of heat exchanger tubes 14, the tube 14 bundles are typically arranged vertically, in a vertical tubular heat exchanger 10, shown in FIG. 1A. Alternatively, the tubes 14 may be arranged in horizontal bundles where cool ambient air travels through the inner diameter of the tube 14 and hot flue gas passes over the tube 14 outer surface, in a horizontal tubular heat exchanger 12, shown in FIG. 2.

Figure 1B:
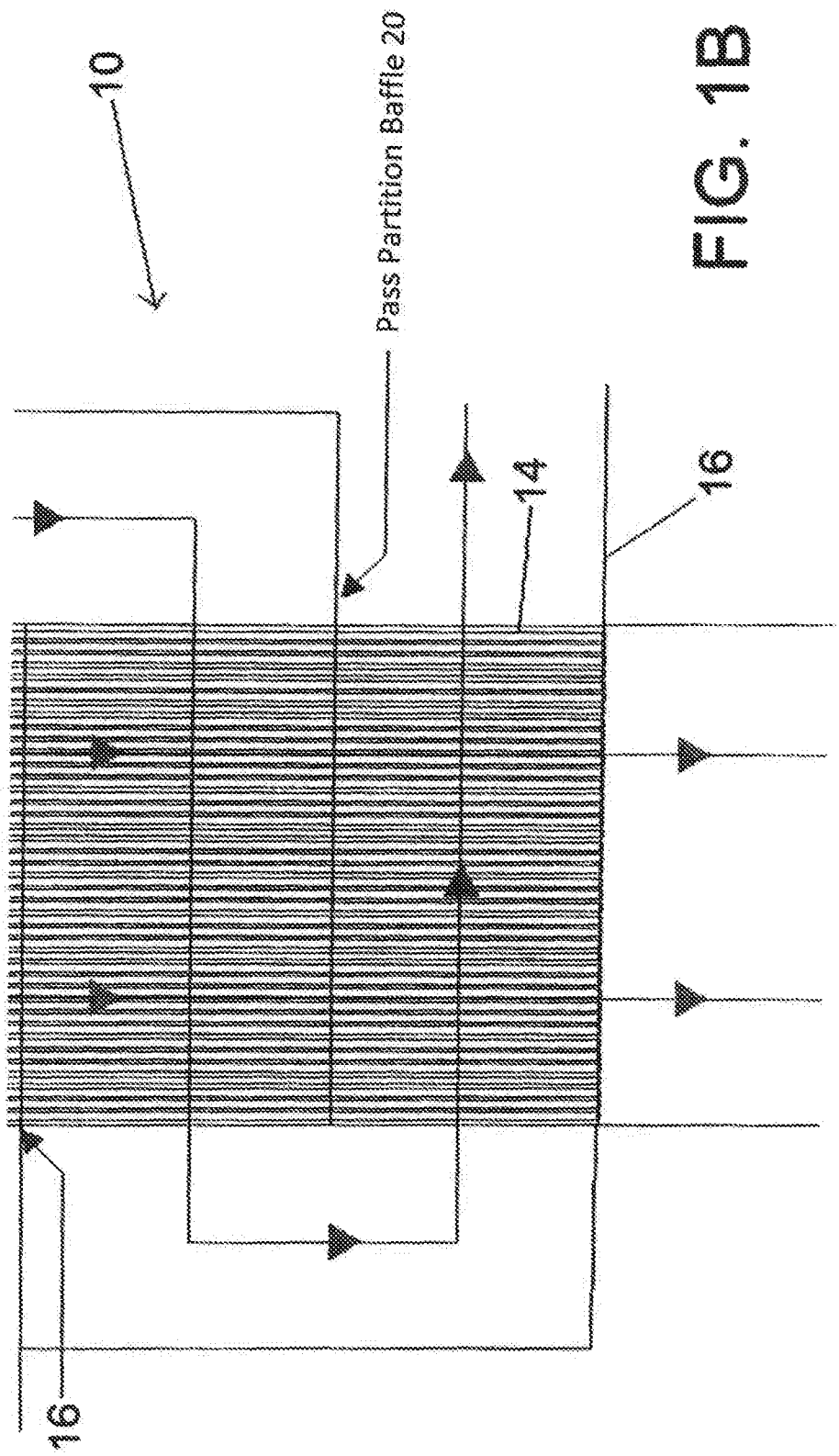
FIG. 1B is a front plan view of a vertical tubular heat exchanger of the system and method for installing external corrosion guards of the present disclosure, showing a pass partition plate.

The tube 14 bundles in both the vertical tubular heat exchanger 10 (FIG. 1) and horizontal tubular heat exchanger 12 (FIG. 2) are supported by tubesheet plates 16 (FIGS. 1, 2) located at both ends of the vertical tubular heat exchanger 10 and the horizontal tubular heat exchanger 12. Depending on the length of the tubes 14, at least one anti-vibration baffle 18 (FIGS. 1A, 2) is used to support the tubes 14 and prevent mechanical damage. Additionally, at least one pass partition plate 20 (FIG. 1B) may be used to support the tubes 14 and to redirect air and/or gas flow, allowing the air and/or gas flow to make multiple passes over the heat exchanger 10, 12.

During outages, water is commonly introduced to the heat exchanger 10, 12 and the water combines with fly ash present in the heat exchanger 10, 12 to form an acidic slurry that causes tube 14 failures to occur at or near the tube 14 as a result of external corrosion. The acidic slurry drips down the tube 14 length causing failures to occur not only at the tubesheet plate 16, anti-vibration baffle 18, and pass partition plate 20 level, but immediately below the level. Presently, there are no protective measures used to guard against the development of tube damage caused by external corrosion.

Figure 3:
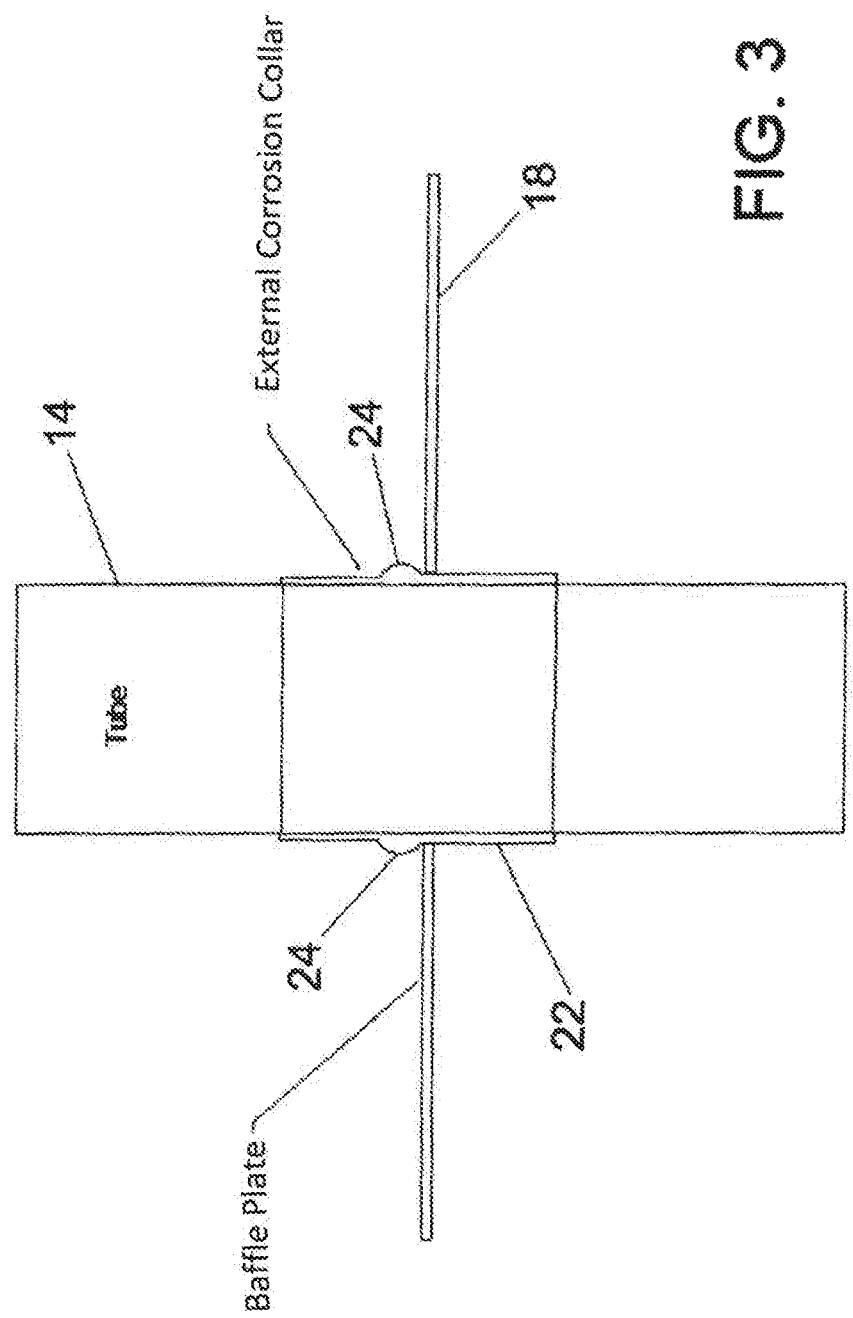
FIG. 3 is a detail view of the ridge method of a first embodiment of the system and method for installing external corrosion guards of the present disclosure.

An illustrated embodiment of the present disclosure comprises a steel collar 22 (FIGS. 3-5) that is installed around the damaged tube 14 at the level of the tubesheet plate 16, anti-vibration baffle 18, or pass partition plate 20. The inner diameter of the steel collar 22 is slightly larger than the outer diameter of the corresponding damaged tube 14 and the steel collar 22 extends a minimum of six inches above and six inches below the tubesheet plate 16, anti-vibration baffle 18, or pass partition plate 20 level.

Figure 6:
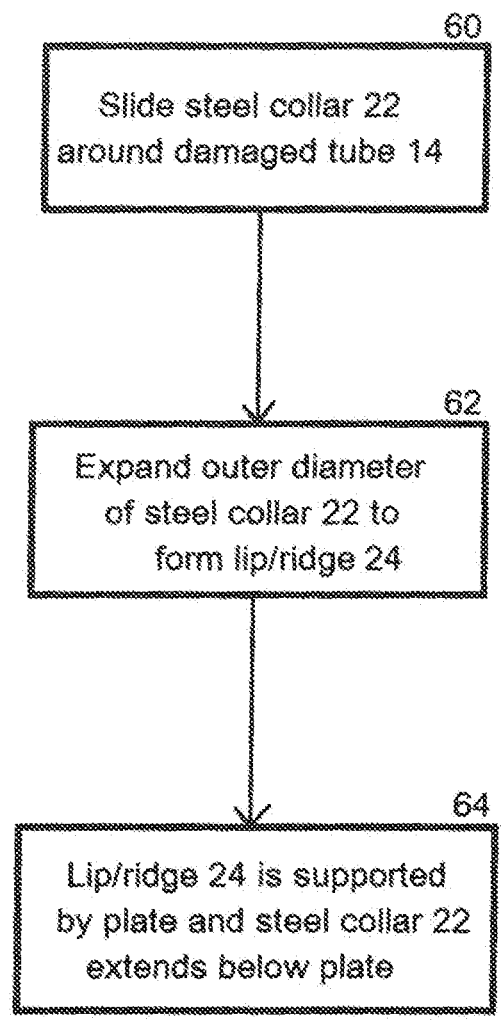
FIG. 6 is a flow diagram showing the steps of the ridge method of the first embodiment of the system and method for installing external corrosion guards of the present disclosure.

Installing the steel collar 22 can be accomplished through various methods. In a first embodiment, shown in FIGS. 3 and 6, the method of installation comprises sliding a steel collar 22 around a damaged tube 14 (60 in FIG. 6) and expanding the outer diameter at one end of the steel collar 22 to form a small lip or ridge 24 at the center level (62 in FIG. 6). The expansion allows the steel collar 22 to sit at the desired tubesheet plate 16, anti-vibration baffle 18, or pass partition plate 20 level, providing protective steel around the damaged tube 14 that extends six inches above and six inches below the tubesheet plate 16, anti-vibration baffle 18, or pass partition plate 20 level (64 in FIG. 6). The extension beneath the tubesheet plate 16, anti-vibration baffle 18, and/or pass partition plate 20 level provides increased protection from the acidic slurry pattern of traveling down the length of the tube 14 and redirects the liquid flow away from the steel.

Figure 4:
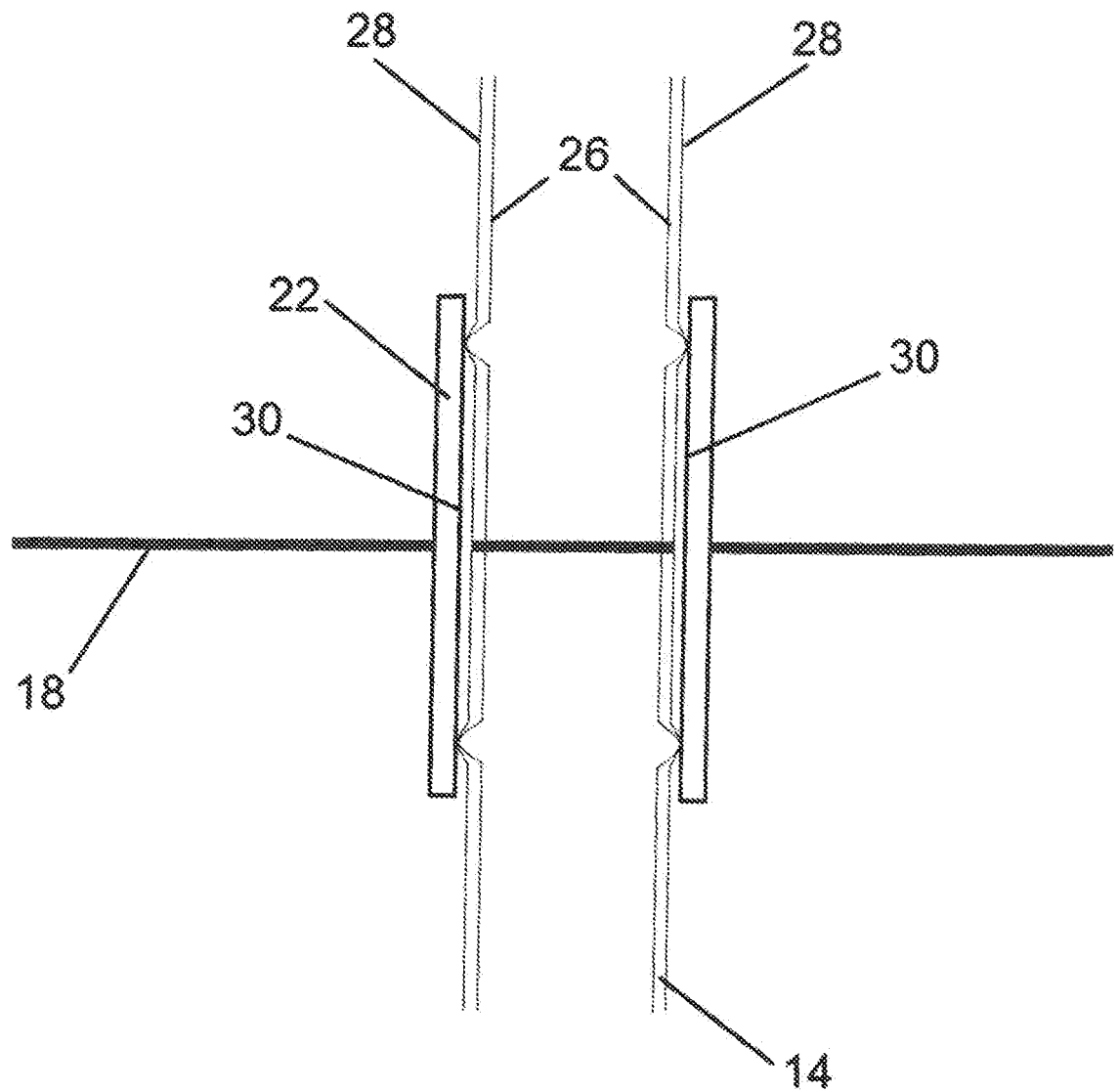
FIG. 4 is a detail view of the mechanical expansion method of a second embodiment of the system and method for installing external corrosion guards of the present disclosure.
Figure 7:
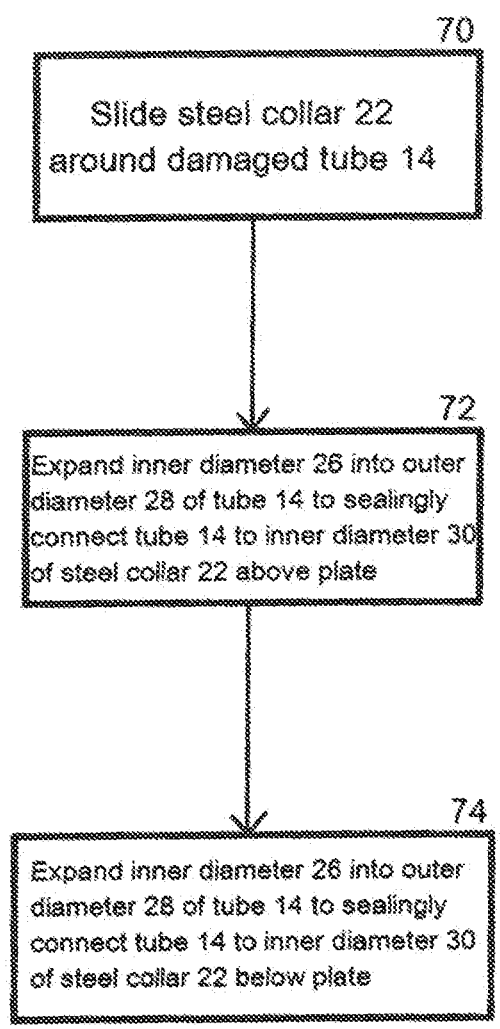
FIG. 7 is a flow diagram showing the steps of the mechanical expansion method of the second embodiment of the system and method for installing external corrosion guards of the present disclosure.

In a second embodiment, shown in FIGS. 4 and 7, the method of installation comprises sliding a steel collar 22 around a damaged tube 14 70 and mechanically expanding the inner diameter 26 of the tube 14 into the outer diameter 28 of the tube 14 to sealingly connect the tube 14 to the inner diameter 30 of the steel collar 22 at a predetermined location above the tubesheet plate 16, anti-vibration baffle 18, or pass partition plate 20 level (72 in FIG. 7). The inner diameter 26 of tube 14 is then mechanically expanded into the outer diameter 28 of the tube 14 to sealingly connect the tube 14 to the inner diameter 30 of the steel collar 22 at a predetermined location below the tubesheet plate 16, anti-vibration baffle 18, or pass partition plate 20 level (74 in FIG. 7). In this second embodiment of the method of installation, the inner diameter 30 of the steel collar 22 is slightly larger than the outer diameter 28 of the damaged tube 14. The steel collar 22 does not contain a lip or ridge but in the illustrated embodiment is one continuous piece of steel extending a minimum of six inches above and six inches below the tubesheet plate 16, anti-vibration baffle 18, or pass partition plate 20 level. Installing the steel collar 22 is accomplished by inserting a dimensionally controlled expansion tool through the inner diameter 26 of the damaged tube 14. The expansion tool uses hydraulic pressure to create a structurally secure and air tight seal between the tube 14 and the steel collar 22. In one embodiment, the outer diameter 28 of the tube 14 is forced outward into the inner diameter 30 of the steel collar 22 to create an air tight seal at a location at least six inches below the tubesheet plate 16, anti-vibration baffle 18, or pass partition plate 20 level and at a location at least six inches above the tubesheet plate 16, anti-vibration baffle 18, or pass partition plate 20 level in the illustrated embodiment.

Figure 5:
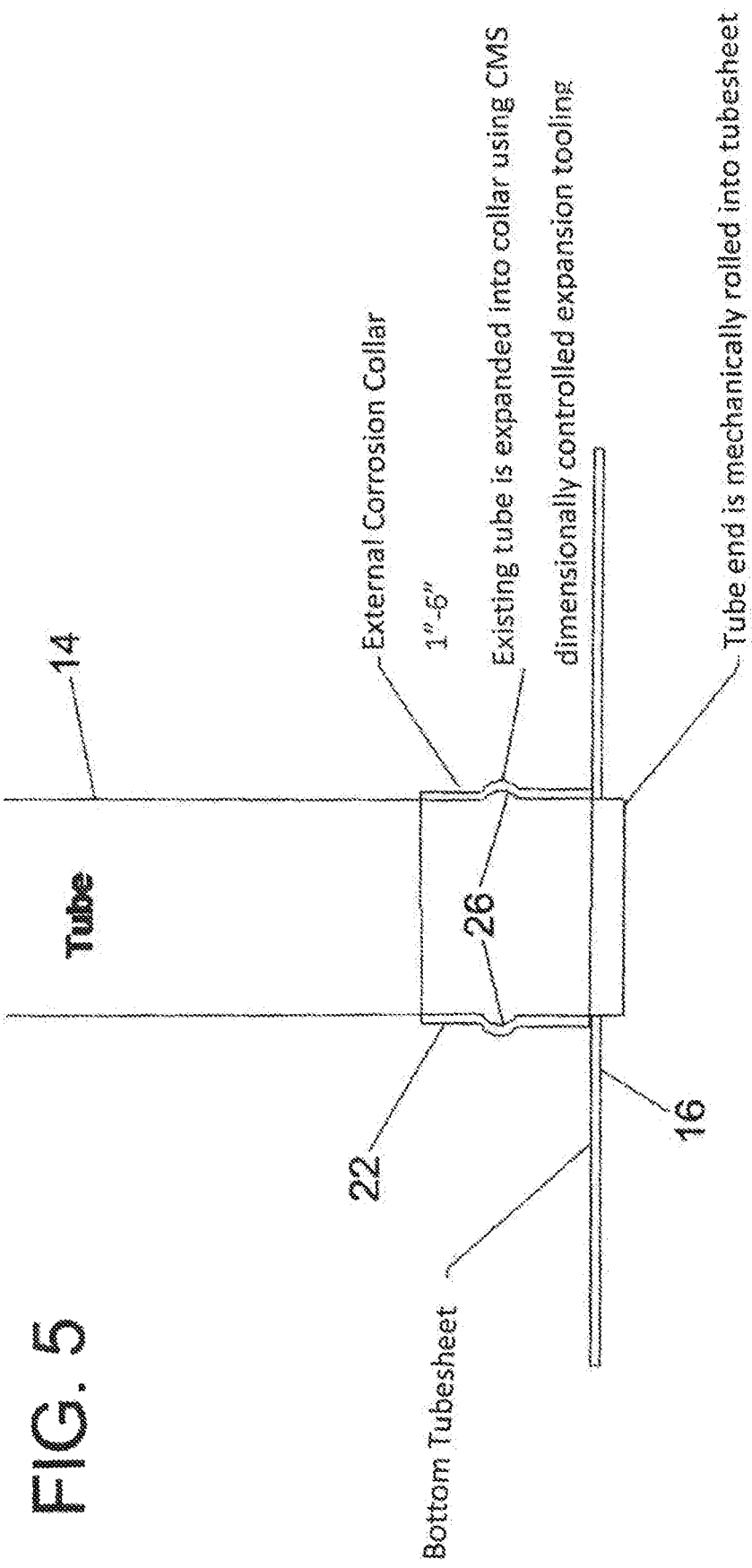
FIG. 5 is a detail view of the mechanical rolling method of a third embodiment of the system and method for installing external corrosion guards of the present disclosure.
Figure 8:
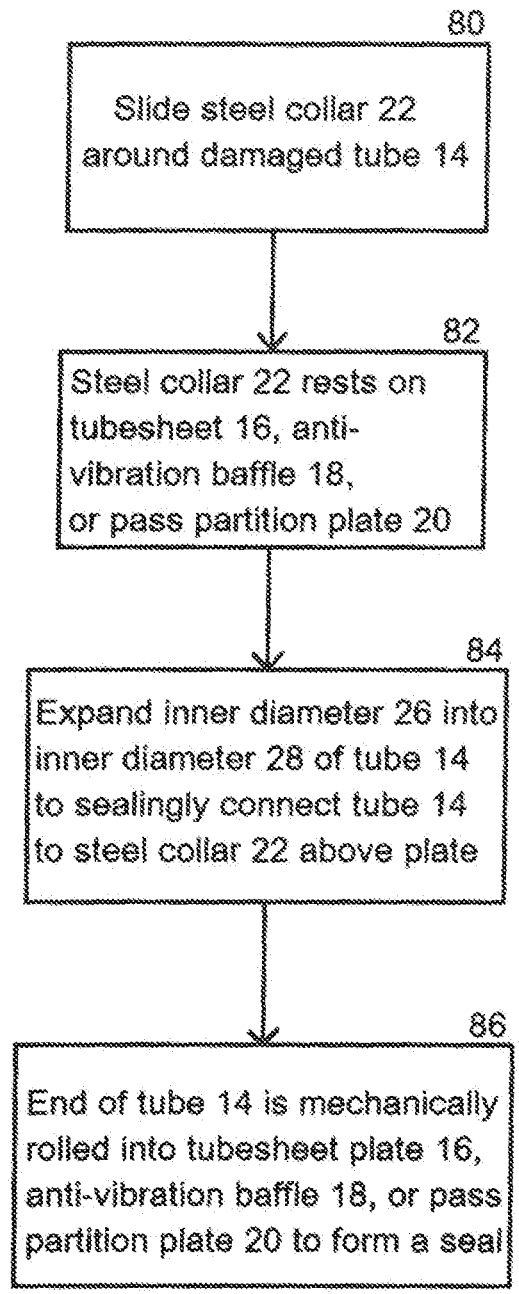
FIG. 8 is a flow diagram showing the steps of the mechanical rolling method of the third embodiment of the system and method for installing external corrosion guards of the present disclosure.

In a third embodiment, shown in FIGS. 5 and 8, the method of installation comprises sliding a steel collar 22 around a damaged tube 14 (80 in FIG. 8) until the steel collar 22 rests on the tubesheet plate 16, the anti-vibration baffle 18, or the pass partition plate 20 (82 in FIG. 8). The inner diameter 26 of the tube 14 is mechanically expanded into the outer diameter 28 of the tube 14 to sealingly connect the tube 14 to the steel collar 22 at a predetermined location above the tubesheet plate 16, the anti-vibration baffle 18, or the pass partition plate 20 level (84 in FIG. 8). The end of tube 14 is then mechanically rolled into the tubesheet plate 16, the anti-vibration baffle 18, or the pass partition plate 20 to form a seal between the tube 14 end and the plate (86 in FIG. 8).

In this third embodiment of the method of installation, the steel collar 22 does not contain a lip or ridge but is one continuous piece of steel. The third method of installation may be used where the spacing of the tubesheet plates 16, anti-vibration baffles 18, or pass partition plates 20 allows and creates a seal between the tubes 14 and the fly ash slurry at the desired tubesheet plate 16, anti-vibration baffle 18, and pass partition plate 20 level.

The result of the first, second, and third embodiments of the installation method is to create a protective barrier of steel protecting against external corrosion at the areas where the air preheater is most vulnerable to damage. The protective barrier serves to significantly extend the service life of the tubes. The three embodiments of the method of installation can be performed during a repair of the heat exchanger 10, 12 or as part of the original heat exchanger design and fabrication.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for protecting a straight walled cylinder tube from external corrosion, comprising:
   a tubular heat exchanger including a top tubesheet plate and a bottom tubesheet plate, said top tubesheet plate and bottom tubesheet plates including a plurality of apertures;
   a plurality of cylindrical tubes disposed between said plurality of apertures in said top tubesheet plate and said plurality of apertures in said bottom tubesheet plate;
   at least one of an anti-vibration baffle and a pass partition plate disposed between said top tubesheet plate and said bottom tubesheet plate, said at least one anti-vibration baffle and pass partition plate including a plurality of apertures adapted to receive said plurality of cylindrical tubes;
   at least one steel collar sealingly connected to at least one straight walled cylindrical portion of the cylindrical tube of said plurality of tubes, said at least one steel collar extending around the outer circumference of the at least one straight walled cylindrical portion of the cylindrical tube only adjacent a region of the cylindrical tube extending through at least one of said top tube sheet plate, said bottom tube sheet plate, said anti-vibration baffle and said pass partition plate, the at least one steel collar adapted to extend a predetermined first distance above and a predetermined second distance below at least one of the top tubesheet plate, bottom tubesheet plate, anti-vibration baffles, and pass partition plate; and
   the at least one straight walled cylindrical portion of the cylindrical tube having a portion extending diametrically outward beyond an outer wall of the at least one straight walled cylindrical portion of the cylindrical tube only at said region at a first position forming a first ridge at the first position, the first position only radially adjacent an inner surface of the at least one steel collar, the first portion only radially adjacent the outward extended portion defining a first ridge on an outer surface of the straight walled cylindrical portion of the cylindrical tube, said first ridge contacting the inner surface of the at least one steel collar at said region, the first ridge forming the sealing connection between the steel collar and the at least one straight walled cylindrical portion of the cylindrical tube at the first position.

2. The system of claim 1, wherein at least one of the predetermined first distance and the predetermined second distance is at least six inches.

3. The system of claim 1, wherein the first position is at a predetermined third distance above at least one of the top tubesheet plate, bottom tubesheet plate, anti-vibration baffle, and pass partition plate, the at least one straight walled cylindrical portion of said cylindrical tube extending diametrically outward only at said region and beyond an outer wall of the at least one straight walled cylindrical portion of the cylindrical tube at a second position, the second position defining a second ridge on an outer surface of the at least one straight walled portion of the cylindrical tube only at said region at the second position, the second ridge contacting an inner surface of the at least one steel collar and forming an additional sealing connection between the steel collar and the at least one straight walled cylindrical portion of the cylindrical tube, said second position radially adjacent the inner surface of the at least one steel collar.

4. The system of claim 3 where the additional sealing connection is at a predetermined fourth distance below at least one of the top tubesheet plate, bottom tubesheet plate, anti-vibration baffle, and pass partition plate.

\* \* \* \* \*